United States Patent [19]

Long, III

[11] 4,093,948
[45] June 6, 1978

[54] TARGET DETECTION IN A MEDIUM PULSE REPETITION FREQUENCY PULSE DOPPLER RADAR

[75] Inventor: William H. Long, III, Bowie, Md.

[73] Assignee: Westinghouse Electric Corp., Pittsburgh, Pa.

[21] Appl. No.: 693,988

[22] Filed: Jun. 8, 1976

[51] Int. Cl.² .................. G01S 7/28; G01S 9/02; G01S 9/42
[52] U.S. Cl. .................. 343/7 A; 343/55 M; 343/7.7; 343/17.1 PF
[58] Field of Search ...... 343/100 LE, 55 M, 7.7 (U.S. only), 343/17.1 PF, 7 A (U.S. only)

[56] References Cited

U.S. PATENT DOCUMENTS

| | | | |
|---|---|---|---|
| 3,094,695 | 6/1963 | Jahn | 343/100 LE |
| 3,349,402 | 10/1967 | Foster | 343/100 LE X |
| 3,659,290 | 4/1972 | Bourque | 343/55 M |
| 3,725,926 | 4/1973 | Ares | 343/7.7 X |
| 3,765,020 | 10/1973 | Seager et al. | 343/55 M |
| 3,787,848 | 1/1974 | Laundry et al. | 343/7 A X |
| 3,831,174 | 8/1974 | King et al. | 343/7 A |
| 3,860,924 | 1/1975 | Evans | 343/7.7 |
| 3,943,511 | 3/1976 | Evans et al. | 343/7 A |
| 3,949,398 | 4/1976 | Donahue | 343/55 M X |
| 3,955,196 | 5/1976 | Nirasawa et al. | 343/7 A X |

Primary Examiner—Malcolm F. Hubler
Attorney, Agent, or Firm—H. W. Patterson

[57] ABSTRACT

A method and apparatus for the processing of return signal data in a single channel, medium pulse repetition frequency, pulse doppler radar receiver in which discrete sidelobe return signals are prevented from being recognized as true targets. The return signal data is processed by a clutter cancellation circuit, which in the preferred embodiment is a doppler filter bank, to remove main beam clutter and a constant false alarm rate threshold circuit to remove area sidelobe clutter return signals. The return signal data is temporarily stored as data blocks which are representative of the return data in the interpulse period of each pulse repetition frequency. The data blocks are unfolded over a predetermined range and two parallel correlations are simultaneously performed over the predetermined range to identify discrete sidelobe clutter return signals. One of the parallel correlations is performed directly on the unfolded data block and the other is performed on the unfolded data which has been compared to a time varying threshold level which varies as a function of range and which is responsive to the area sidelobe clutter return signals such that the discrete sidelobe clutter return signals may be detected from a comparison of the correlations. The discrete sidelobe return signals thus determined are folded into data blocks which are used to blank the sidelobe discrete return signals from the output of the constant false alarm rate threshold circuit. With the sidelobe discrete return signals blanked, the data blocks are unfolded over a second predetermined range and correlated to determine the true range of the target. In an alternative embodiment, the time varying threshold level is not responsive to the area sidelobe clutter return signals, but the returned signals are normalized with respect to the level of the area sidelobe clutter return signals to improve the detection of sidelobe discrete return signals.

10 Claims, 9 Drawing Figures

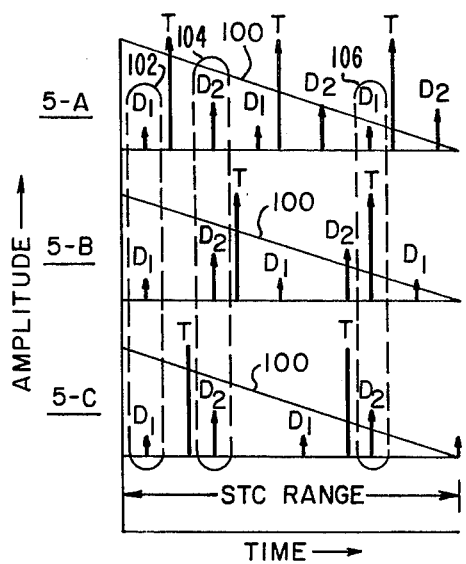
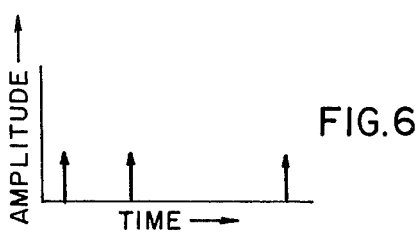
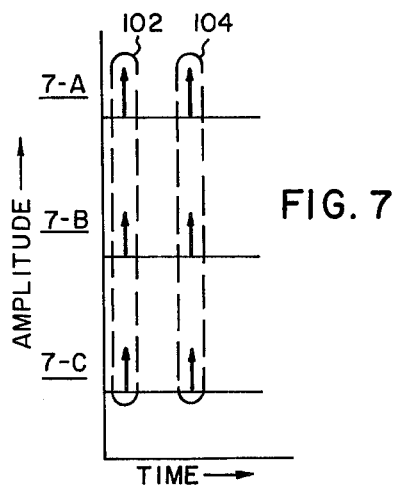
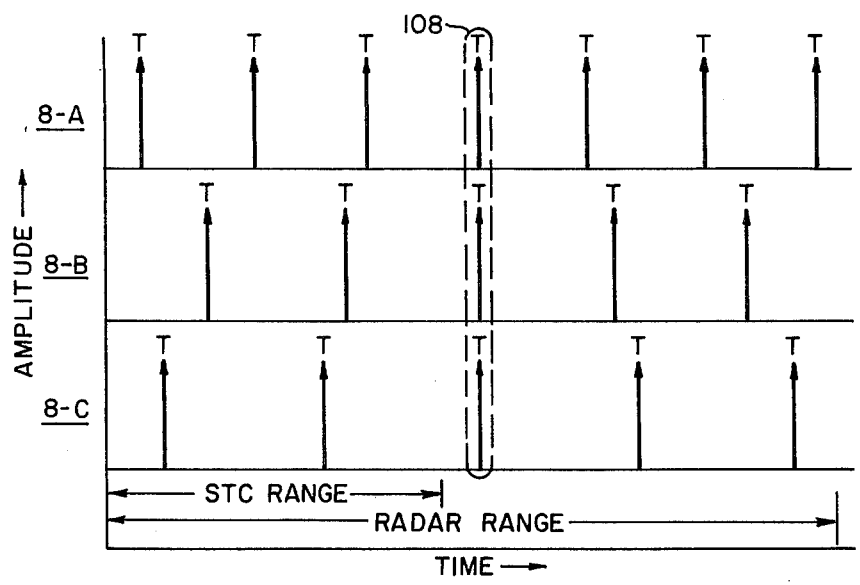
FIG. 5
FIG. 6
FIG. 7
FIG. 8

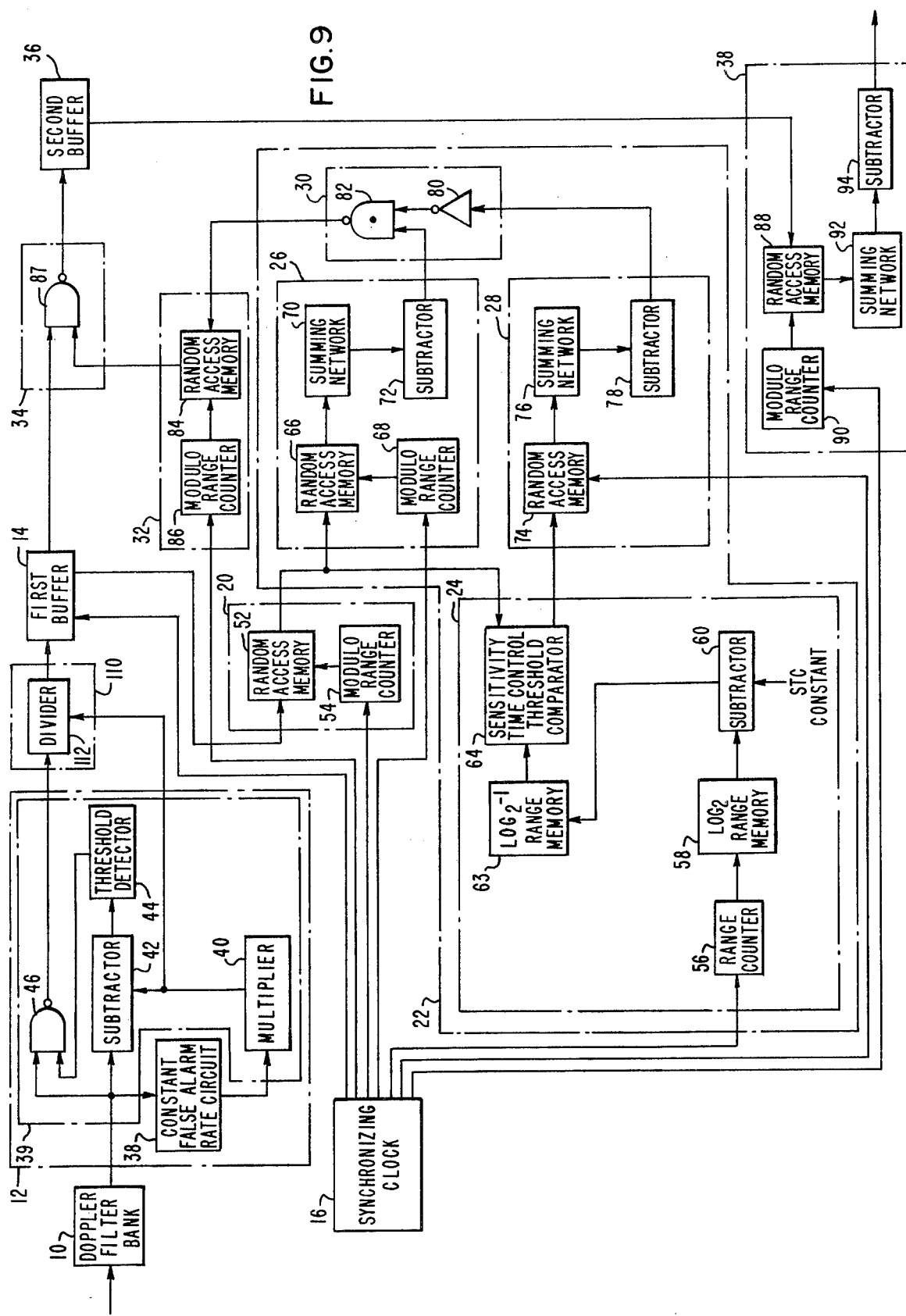

TARGET DETECTION IN A MEDIUM PULSE REPETITION FREQUENCY PULSE DOPPLER RADAR

STATEMENT OF GOVERNMENTAL INTEREST

The invention herein described was made in the course of or under a contract or subcontract thereunder with the Department of the Air Force.

CROSS-REFERENCES TO RELATED APPLICATIONS

The present invention is an improvement upon the medium frequency radar receivers described in "Target Detection System in a Medium PRF Pulse Doppler Search/Track Radar Receiver", Ser. No. 665,348, filed Mar. 9, 1976, by John C. Kerk; and "Post-Detection STC in a Medium PRF Pulse Doppler Radar", Ser. No. 690,754, filed May 27, 1976, by David H. Mooney, Jr.

BACKGROUND OF THE INVENTION

FIELD OF THE INVENTION

The present invention is directed to an improved, medium pulse repetition frequency, radar receiver for detecting the range of targets.

DESCRIPTION OF THE PRIOR ART

Since electromagnetic energy propagates at a known speed through free space, pulse doppler radar sets can determine the range of a target by determining the time necessary for a transmitted pulse to be reflected by a target and return to the radar set. The frequency at which the radar transmitter is pulsed is known as the pulse repetition frequency or, the PRF. A medium PRF pulse doppler radar is characterized in that pulses are successively transmitted at such a frequency that it is not known with certainty which transmitted pulse is associated with which received return signal. That is, in a medium PRF pulse doppler radar, the range indication of the received signal returns is ambiguous in that there are a plurality of ranges at which the target would satisfy the timing of the received signal return depending upon which transmitted pulse was being reflected. It was recognized in the prior art that, although the target range would be ambiguous for any particular PRF, the range ambiguities would vary depending upon the particular PRF used so that the true target range could be determined by transmitting signals at a plurality of PRF's and correlating the received signals to resolve the range ambiguities.

The resolution of the target range in medium PRF radars by the correlation of signal returns for a plurality of PRF's emphasizes the importance of discriminating between returns reflected by the target and the other returns received by the radar set. The presence of these extraneous signals could correlate and result in false target reports, commonly referred to as ghost targets. These extraneous signals are generally comprised of area clutter returns from the main beam and the sidelobes of the antenna, and discrete clutter returns from the antenna sidelobes. Main beam and sidelobe area clutter results from background reflections of the main beam and sidelobe antenna patterns while discrete sidelobe clutter is a high amplitude signal which is reflected from a significant object, such as a building, contained within the antenna sidelobe pattern.

In some radar receivers of the prior art, two separate receiver channels, a main channel and a guard channel, were used to distinguish target return signals from the main beam and area sidelobe clutter returns and from discrete sidelobe returns in a medium PRF radar set. Since the doppler shift in the main beam clutter returns is predictable, clutter cancellation circuits, which were typically filter banks, contained in both receiver channels eliminate main beam clutter returns by rejecting signals which were doppler shifted by a frequency corresponding to the motion of background in the main antenna beam relative to the reference frame of the radar receiver. Signals passed by the main receiving channel were provided to a constant false alarm rate circuit having an adaptive threshold level which varied in response to the level of the area sidelobe clutter returns to eliminate area sidelobe clutter returns. To eliminate discrete sidelobe clutter returns, the main receiver channel was provided with an antenna having a high gain main beam reception response and a low gain sidelobe reception response and the guard channel was provided with an antenna having a broad beam gain response which is comparatively higher than the sidelobe response of the main antenna and comparatively lower than the main beam response of the main antenna. Due to these antenna characteristics, the guard channel gave a higher amplitude to the discrete sidelobe clutter than did the main channel so that the discrete sidelobe clutter in the guard channel was used to cancel the detected discrete sidelobe clutter in the main channel.

The redundancy inherent in the above-described dual channel receiver of the prior art is undesirable in that it deleteriously affects the cost, size, weight and reliability of the radar set. One prior art attempt to eliminate this redundancy involved a single channel receiver which employed an ultra-low sidelobe antenna which, as it was intended, would ignore the discrete sidelobe clutter returns which necessitated the guard channel of the prior art receiver. Although such an ultra-low sidelobe antenna receiver is suitable for limited applications, it is unsuited for applications in which discrete sidelobe clutter returns are high and are necessarily received as a result of the close proximity of the discrete clutter sources to the radar antenna.

In another prior art attempt to avoid the redundancy of the dual channel radar receiver, a doppler filter bank removed the main beam clutter and a constant false alarm rate circuit removed the area sidelobe clutter from a single receiving channel. The remaining ambiguous received signal returns, comprised of the target returns and the discrete sidelobe clutter returns, are unfolded over a predetermined range and compared with a time varying amplitude threshold level which, therefore, also varied as a predetermined function of range from the radar antenna. The range over which the ambiguous signals were unfolded extended to a point where discrete sidelobe clutter returns were below the detection threshold of the constant false alarm rate circuit. The predetermined function of the time varying threshold level was determined with respect to the predicted amplitude of the target returns and with respect to the predicted amplitude of the discrete sidelobe returns so that the target return signals would exceed the threshold but the discrete sidelobe returns would not. In this prior art system, however, discrete sidelobe clutter returns which exceeded the time varying threshold would be correlated with target returns and could cause the receiver to detect ghost targets.

In yet another prior art receiver, which is the receiver upon which the presently improved receiver is based, a single channel was provided with a doppler filter bank for eliminating the main beam clutter returns and with a constant false alarm rate circuit for eliminating the area sidelobe clutter returns. The remainder of the received signals, comprised of the target returns and the discrete sidelobe clutter returns, was unfolded over a predetermined range, and simultaneously correlated with unfolded data which had been previously compared to a time varying threshold level so that the comparison of the two correlations determined the occurrence of discrete sidelobe clutter returns. This discrete sidelobe clutter data was then folded into a data block corresponding to the original data block provided by the constant false alarm rate circuit and used to blank the discrete sidelobe clutter returns from the constant false alarm rate data blocks so that the signal returns could be correlated to detect the range of the target. In this prior art receiver, the time varying threshold was set at an absolute level so that, although the constant false alarm rate circuit varied the nominal threshold level to eliminate area sidelobe clutter returns of significantly increased amplitude, discrete sidelobe returns having an amplitude greater than originally predicted would exceed the time varying threshold and not be detected as a discrete sidelobe clutter return but, rather, would be correlated with the target returns. Although statistically infrequent occurrences of this nature would not materially detract from the performance of the radar receiver, the problem of false target reports became acute where the discrete sidelobe returns became generally greater than the time varying threshold. Typically, the problem would manifest itself over urban areas where it has been determined that the amplitude of both discrete and area sidelobe clutter returns is significantly greater than over other types of terrain.

Accordingly, there was a need for a single channel, medium PRF pulse doppler radar which could distinguish target returns from discrete sidelobe clutter returns without regard to the absolute amplitude of the signals received. Such a receiver would have improved performance over a broad range of environmental applications.

SUMMARY OF THE INVENTION

In accordance with the present invention, a single channel radar receiver distinguishes target returns from extraneous received signals which include discrete sidelobe clutter returns of varying amplitude, to determine the range of a target. A doppler filter bank removes main beam clutter returns and a constant false alarm rate threshold circuit eliminates area sidelobe clutter returns in a plurality of signals of various pulse repetition frequencies (PRF's). The remaining target returns and discrete sidelobe clutter returns in the interpulse period of each PRF comprise a data block for each PRF which represents an ambiguous target range. This data block is unfolded over a predetermined range by a range unfolder and compared in a sensitivity time control threshold network to a time varying threshold which is responsive to the threshold level of the constant false alarm rate circuit. The unfolded data of the range unfolder is correlated in a first correlator while the unfolded data which exceeded the sensitivity time control threshold is simultaneously correlated in a second correlator and the two correlations compared to determine the occurrence of discrete sidelobe clutter returns in the unfolded data. The discrete sidelobe clutter returns of the unfolded data are then folded in a range folder into data blocks corresponding to their respective PRF's and provided to a data blanker to blank the discrete sidelobe clutter signals from the data blocks of the output of the constant false alarm rate threshold circuit. The target returns remaining in the data blocks are then unfolded and correlated to determine the range of the target.

BRIEF DESCRIPTION OF THE DRAWINGS

FIG. 5 represents the comparison made by the sensitivity time control threshold network of FIG. 1 for the unfolded signals of FIG. 4.

FIG. 6 illustrates the output of the comparator for the unfolded signals of FIG. 4 provided to the first correlator and for the amplitude comparison of FIG. 5 provided to the second correlator.

FIG. 7 illustrates the data blocks provided by the range folder in response to the signals of FIG. 6.

FIG. 8 illustrates the correlation occurring in the third correlator of FIGS. 1 and 2 for the unfolded data blocks of FIG. 3 as blanked by the data blocks of FIG. 7; and FIG. 9 is a block diagram of a single channel medium PRF receiver illustrating an alternative embodiment of the present invention.

DESCRIPTION OF THE PREFERRED EMBODIMENT

Figure 1:
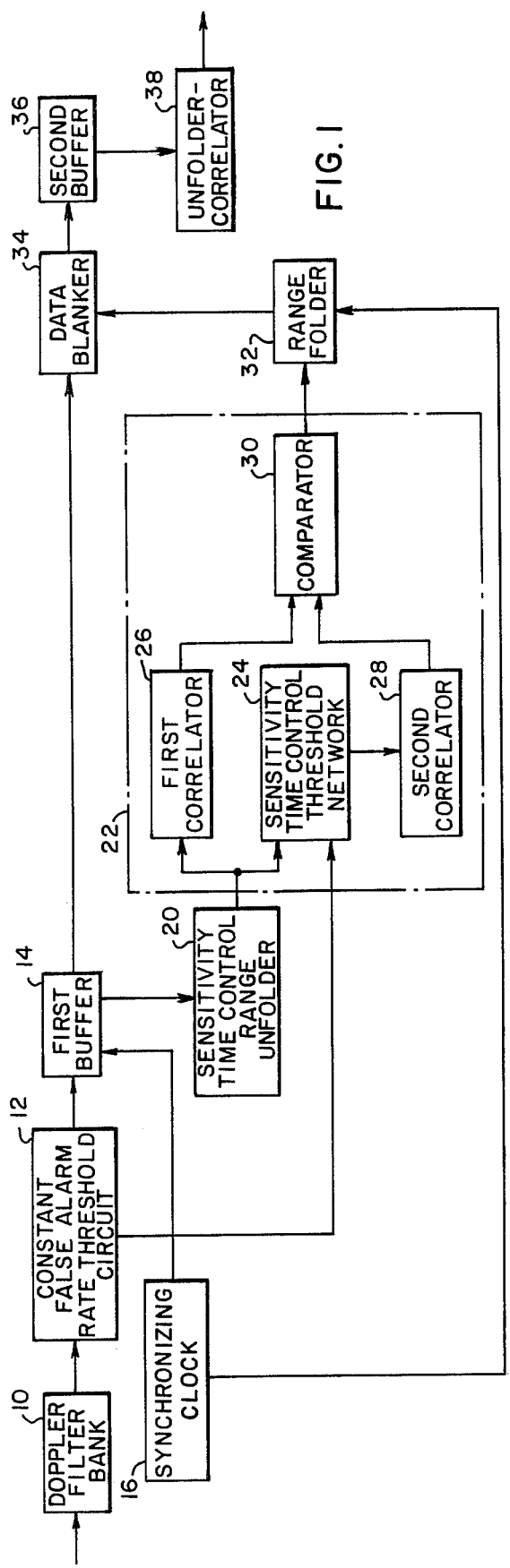
FIG. 1 is a block diagram of a single channel, medium PRF radar receiver which illustrates the preferred embodiment of the present invention.

FIG. 1 is a block diagram representing a single channel, medium PRF radar receiver which employs the present invention to provide improved detection of the range of a target. Prior to the operation of the apparatus disclosed in the block diagram of FIG. 1, a predetermined number of pulses are transmitted by the radar transmitter (not shown) at a plurality of pulse repetition frequencies, hereinafter referred to as PRF's. The time which elapses between successive pulses of a particular PRF is referred to as the interpulse period; and, as well known to those skilled in the pertinent art, Fast Fourier transform operations are performed to convert signals received during this interpulse period from the time domain to the frequency domain for each PRF which is transmitted by the radar set. For each PRF transmitted by the radar set, the interpulse period, whose duration is determined by the frequency of the PRF, defines a PRF data block which is the fundamental element of the Fast Fourier Transform and which provides an ambiguous indication of the range to the target, obscured by extraneous, main beam clutter returns, and area and discrete sidelobe clutter returns. In digital type radar sets, each PRF data block is comprised of a number of range units which represents the highest range resolution attainable by the radar set as a consequence of the basic speed of operation of the radar set and the relatively high speed of electromagnetic energy propagation through free space. Since the radar receiver determines the range of a target by translating range distance into time and measuring time, the time of a range unit represents a fundamental range distance which forms the upper limit of the radar's range resolution capability. Of course, the PRF data blocks, which are comprised of various numbers of range units, also represent discrete range distances the length of which depend upon the number of range units comprising the PRF data block. Since the above-mentioned operations are well known in the processing of radar signals and are considered to be outside the scope of the present invention, they have been referred to generally to focus the operation of the present invention in the radar set.

The embodiment of FIG. 1 provides an improved method and apparatus for distinguishing the target return signals and resolving their range ambiguities. FIG. 1 is a block diagram which affords a general description of the operation of the preferred embodiment of the present invention. A doppler filter bank 10 eliminates the main beam clutter signals and a constant false alarm rate threshold circuit 12, which is responsive to the doppler filter bank 10 and is hereafter referred to as CFAR threshold circuit 12, eliminates the area sidelobe clutter signals from the signals received by the radar antenna and subjected to Fast Fourier Transformation processing. A first buffer 14 stores the target returns and discrete sidelobe clutter returns which remain and, upon a signal from synchronizing clock 16 successively provides data blocks of the respective PRF's to a sensitivity time control unfolder 20 hereafter referred to as STC unfolder 20, which reproduces the data block pattern for a predetermined time in relation to a sensitivity time control range. The length of the sensitivity time control range and, therefore, the duration of the predetermined time, is determined by the range at which the amplitude of the discrete sidelobe clutter returns is predicted to be below the detection threshold of the constant false alarm rate circuit. The unfolded data block signal of the range unfolder 20 is connected to a discrete sidelobe detection circuit 22 which detects the occurrence of discrete sidelobe clutter signals, including discrete sidelobe clutter signals of a relatively high level which could otherwise be confused with target returns and cause the detection of ghost targets. The discrete sidelobe detection circuit 22 includes a sensitivity time control threshold network 24, hereafter referred to as STC threshold network 24, a first correlator 26, a second correlator 28 and a comparator 30. Studies of empirical data have determined that different types of terrain have different characteristic levels of area and discrete sidelobe returns. For example, for an aspect angle of 40°, that is, the angle between the surface of the terrain and the direction of the electromagnetic wave propagating from the radar antenna is 40°, it has been found that the level of area clutter returns for X-Band radar is about −26 dB relative to a one square meter target relative to a where the background terrain is open sea, agitated by a 15 to 20 knot wind, but the level is about −19 dB when the background terrain is desert sand. Similarly, the level of area clutter returns has been found to be in the range of −9 dB to −14 dB over heavy vegetation, −2 dB to −8 dB over residential areas; 7 dB to 1 dB over commercially developed area; and 15 dB to 8 dB over heavily industrial areas. Although the range limits were found to vary somewhat depending upon the aspect angle of the terrain, and the precise value within the range was dependent upon the particular terrain which was considered, the general order between terrains which is described above was found to be constantly maintained.

Also, it was found that discrete sidelobe returns follow the same general order between terrains as has been described for area clutter returns. Therefore, the level of discrete sidelobe clutter returns is greatest over commercially and industrially developed terrain, where the level of area sidelobe clutter is greatest, and the level of discrete sidelobe clutter returns is lowest over open sea and desert terrain where the level of area sidelobe clutter is lowest. This phenomenon is utilized in accordance with the present invention to prevent the discrete sidelobe clutter returns from exceeding the level of the STC threshold such that they are recognized as true target returns and correlated to indicate ghost targets. In the preferred embodiment, the object of the present invention is accomplished by controlling the STC threshold level of the STC threshold network 24 in response to variations in the level of the area sidelobe clutter returns. Because the STC threshold level tracks the level of the area sidelobe clutter returns, a discrete sidelobe clutter return having a high level in the presence of area sidelobe clutter returns of a high level would be no more likely to exceed the STC threshold level than would a low level discrete sidelobe clutter return having the presence of area sidelobe clutter of a low level. The discrete sidelobe clutter returns detected by discrete sidelobe detection circuit 22 are provided to a range folder 32 which folds the discrete sidelobe clutter signals into a PRF data block having the same number of range cells as the PRF data block corresponding to the same PRF which was provided by the first buffer 14 to the range unfolder 20. Under the control of the synchronizing clock 16, the PRF data block of the normalized threshold circuit 12 and the PRF data block of the range folder 32 are simultaneously provided to the data blanker 34 which cancels the discrete sidelobe clutter returns from the PRF data block provided by the first buffer 14 leaving a PRF data block which contains only target returns. The cancelled PRF data blocks provided by data blanker 34 are stored in a second buffer 36 until the PRF data block associated with each PRF has been similarly processed. These PRF data blocks are then unfolded over the predetermined range of the receiver and correlated in an unfolder-correlator 38 to determine the range of the target which is provided on the output channel 40.

Figure 3:
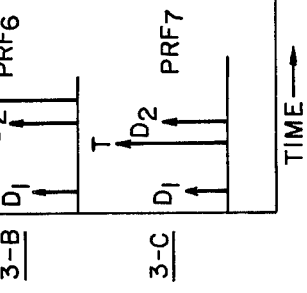
FIG. 3 represents three data blocks which comprise the output of the constant false alarm rate threshold circuit of FIGS. 1 and 2.
Figure 2:
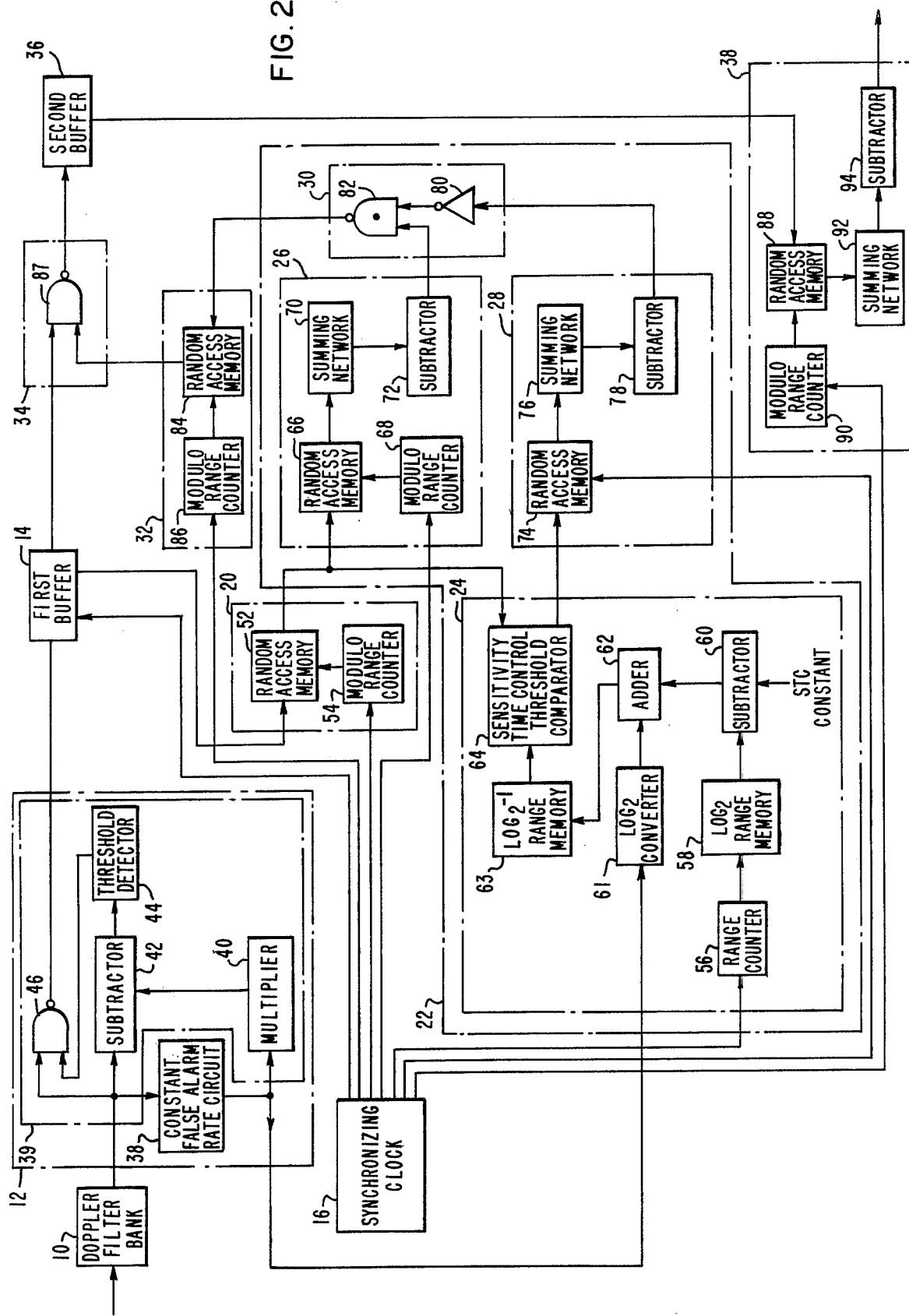
FIG. 2 is a more detailed block diagram of the single channel medium PRF radar receiver of FIG. 1.

In FIG. 2, the PRF data blocks of each PRF are applied by the Fast Fourier Transform mechanization (not shown) to the doppler filter bank 10 which removes signals having the predicted doppler shift of the background of the main beam to remove main beam clutter signals from the extraneous signals of the PRF data blocks. The CFAR threshold circuit 12, which is responsive to the doppler filter bank 10, provides a constant false alarm rate threshold signal which is responsive to the level of intensity of the area sidelobe clutter. The constant false alarm rate threshold, or CFAR threshold, serves to eliminate the area sidelobe clutter returns included in the received signal. CFAR threshold circuit 12 includes a constant false alarm rate circuit 38, hereinafter referred to as CFAR circuit 38, and a comparator 39 which is comprised of a multipler 40, a subtractor 42, a threshold detector 44 and an AND gate 46. CFAR circuit 38 provides a range and frequency averaging of the area sidelobe clutter which varies in response to fluctuations in the intensity of the received clutter. Such CFAR circuits are well known and are discussed in Radar Handbook by M. I. Skolnik and in U.S. Pat. No. 3,701,149 by T. R. Patton and M. B. Ringel. The output of the CFAR circuit 38 is provided to the multiplier 40 which converts the level of the output of CFAR circuit 38 to a threshold level which is determined by the false alarm report rate desired for the system. The outputs of the multipler 40 and the doppler filter bank 10 are provided to the subtractor 42 which provides the difference of the two outputs to the threshold detector 44 which provides an output pulse whenever, as determined by the subtractor 42, the difference of the threshold level of the multiplier 40 from the output of the doppler filter bank 10 is positive. The AND gate 46 is responsive to the threshold detector 44 and the doppler filter bank 10 to eliminate the area sidelobe clutter returns in the output of the doppler filter bank 10 by conducting only that portion of the filter bank output which exceeds the threshold level established by the multiplier 40 in response to the CFAR circuit 38. One example of an output of the CFAR threshold circuit 12 is shown in FIG. 3 which illustrates the target returns T and the discrete sidelobe clutter returns $D_1$ and $D_2$ for three PRF data blocks $PRF_5$, $PRF_6$ and $PRF_7$ which are comprised of 5, 6 and 7 range units respectively. It will be recognized by those skilled in the art that the number of data blocks and their duration may be selected arbitrarily in accordance with the design of the radar receiver and that, typically, a larger number of PRF data blocks having a higher number of range units are used for the detection of a target. However, since the same concepts apply regardless of the number and size of the PRF data blocks, the example of FIG. 3 has been selected to simplify the description of the operation of the preferred embodiment. Similarly, the size of the range units which comprise a PRF data block is arbitrary in that it depends principally upon the speed at which the radar receiver was designed to operate.

The data blocks of FIG. 3 are stored in the first buffer 14 (FIG. 2) and, upon a command from the synchronizing clock 16, each PRF data block is successively provided on line 18 to the range unfolder 20.

Figure 4:
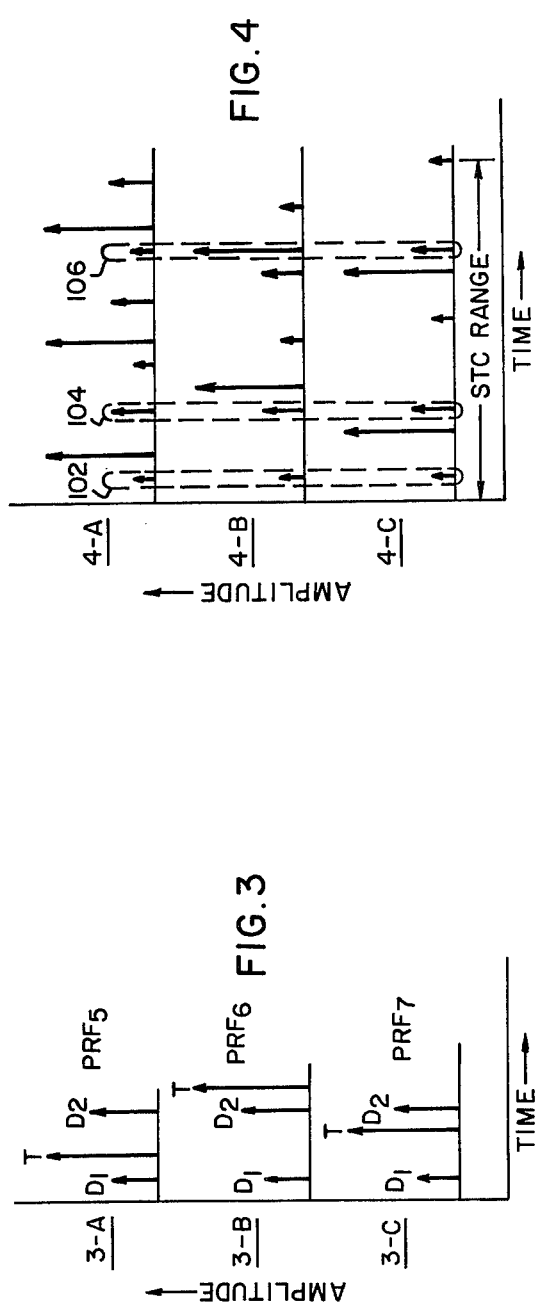
FIG. 4 is representive of the output of the range unfolder of FIG. 1 for the data blocks illustrated in FIG. 3.

In the preferred embodiment, the range unfolder 20 is comprised of a random access memory 52 and a modulo range counter 54. As used herein, random access memories and modulo range counters are commercially available devices identified as 25LS00 and 25LS163 respectively which may be obtained from Advanced Micro Devices Inc. Although these particular devices are identified as the random access memories and the modulo range counters of the example of the preferred embodiment, it will be apparent to those skilled in the pertinent art that other devices which perform a similar function could also be used. The random access memory 52 has at least as many addresses as the number of range units in the largest PRF data block for the receiver and, for each address, a sufficient number of data bits to store the amplitude information of the signals contained in the PRF data blocks. When a PRF data block is loaded into the random access memory 52 from the first buffer 14 by the synchronizing clock 16, the synchronizing clock 16 provides a signal to the modulo range counter 54 which is indicative of the number of range units in the PRF data block and causes the modulo range counter to access that number of addresses in the random access memory 52 in repeated succession to unfold the PRF data block over a predetermined range. By the statement that the PRF data block is unfolded over a range, it is meant that the PRF data block is duplicated a sufficient number of times that the chain of PRF data block duplications will extend over the intended range. Therefore, the length of the range determines the number of times the addresses of the random access memory 52 are accessed for a particular PRF data block. The length of the predetermined range is established by the range at which the amplitude of the discrete slidable clutter returns are statistically predicted to fall below the detection threshold level of CFAR threshold circuit 12. Waveforms 4-A, 4-B and 4-C of FIG. 4 illustrate the unfolded PRF range signals of PRF data blocks 3-A, 3-B and 3-C respectively.

For each PRF data block, corresponding to a particular PRF, which is provided to the STC range unfolder 20, an unfolded range signal is provided to the discrete sidelobe detection circuit 22 for detecting discrete sidelobe clutter returns contained in the unfolded range signal. The discrete sidelobe detection circuit 22 includes the sensitivity time control threshold network 24, hereafter STC threshold network 24, a first correlator 26, a second correlator 28 and a comparator 30. The STC threshold network 24 compares the unfolded range signal of each data block with a sensitivity time control threshold level, hereafter STC threshold level, to determine whether a signal occurring in a particular range unit of the unfolded range signal represents a discrete sidelobe clutter return. Thus, the present usage of the phrase "sensitivity time control", abbreviated as STC, is to be contrasted with usage in the prior art which indicated the attenuation of signals received by a radar set as a function of range. There is, in this embodiment, a comparison technique as opposed to an attenuation. The comparison made by the STC threshold network 24 is illustrated in waveforms 5-A, 5-B and 5-C of FIG. 5. The STC threshold network 24 includes a range counter 56, a $\log_2$ range memory 58, a subtractor 60, a $\log_2^{-1}$ range memory 63 and a sensitivity time control threshold comparator 64 hereafter STC threshold comparator. As the PRF data block is being unfolded in range unfolder 20 to provide the unfolded range signal, synchronizing clock 16 also provides a signal to the range counter 56 which maintains a count of range units and, for each range unit, accesses an address in the $\log_2$ range memory 58. The $\log_2$ range memory 58, which is comprised of a read only memory, provides an output which is the $\log_2$ value of a predetermined function of range. The range function represents the STC threshold level and is determined from empirical data and, for the preferred embodiment, is a factor of the fourth power of the range. From each output of the $\log_2$ range memory 58 which represents a range gate counted by the range counter 56, the subtractor 60 subtracts a value, the magnitude of which is controllably varied by a processing unit (not shown) to provide a reference for the STC threshold level. Although the presently disclosed invention would function equally well if the value subtracted by the subtractor 60 were constant, this value is made controllably variable in the preferred embodiment to afford flexibility in the range over which the STC threshold level is to be compared to the unfolded range signal. The preferred embodiment of the radar receiver is thereby made available for a plurality of operational conditions. In accordance with the present invention, the mechanization for providing the variable STC threshold level for eliminating discrete sidelobe clutter returns by causing the STC threshold level to track the area sidelobe clutter level includes a $\log_2$ converter 61 and an adder 62. The $\log_2$ converter 61, which is comprised of a read only memory, converts the level of the area sidelobe clutter returns provided by CFAR circuit 38 to its $\log_2$ value and provides this value to the adder 62 which adds the $\log_2$ value to the output of the subtractor 60 so that the output of the adder 61 will be varied in response to the level of the area sidelobe clutter returns as determined by the CFAR circuit 38. The output of the adder 61 is provided to the $\log_2^{-1}$ range memory 63, which also is comprised of a read only memory. The $\log_2^{-1}$ range memory 63 serves the inverse function of $\log_2$ range memory 58 and converts the $\log_2$ range output of adder 61 into the STC threshold level which is a fourth power function of the range. Since the output of the adder 61 is responsive to the level of the area sidelobe clutter returns as determined by the CFAR circuit 38, the STC threshold level provided by the $\log_2^{-1}$ range memory is also responsive to the level of the area sidelobe clutter returns. This STC threshold level provided by the $\log_2^{-1}$ range memory 63 is compared with the unfolded range signal provided by the range unfolder 20 in the STC threshold comparator 64. When the signal of the unfolded data block exceeds the STC threshold level provided by $\log_2^{-1}$ range memory 63, an output signal indicating a target return is provided to the second correlator 28; and when the unfolded range signal of range unfolder 20 is less than the STC threshold level determined by range memory 63, STC threshold comparator 64 provides no output. As discussed earlier, the level of the discrete sidelobe clutter returns will vary depending upon the terrain which the antenna pattern is exposed to. However, as was also explained, the level of the area sidelobe clutter returns will also vary with the terrain and will follow the same basic variation pattern as the discrete sidelobe clutter returns. Therefore, although the level of the discrete sidelobe clutter returns will vary, since the STC threshold level tracks the level of the area sidelobe clutter returns, discrete sidelobe clutter returns of a high level will be no more likely to exceed the STC threshold level than discrete sidelobe clutter returns of a relatively lower level. As will be made apparent in the description of the preferred embodiment, this will prevent these high level discrete sidelobe clutter returns from being detected as target returns, therefore causing the receiver to detect ghost targets.

Under the control of the synchronizing clock 16, the first correlator 26 and the second correlator 28 simultaneously store the unfolded range signal of the range unfolder 20 and the target returns detected by the STC threshold comparator 64 respectively for each unfolded PRF data block. When the first correlator 26 and the second correlator 28 have stored the unfolded range signal and the target returns detected by the STC threshold comparator 64 for each of the PRF range signals, first correlator 26 and second correlator 28 individual correlate the stored data and provides an output signal for each range gate in which there is correlation among all the stored PRF range signals. First correlator 26 is comprised of a random access memory 66, a modulo range counter for each PRF data block, indicated generally as modulo range counter 68, a summing network 70 and a subtractor 72. Random access memory 66 is provided with an address for each range gate in each PRF data block and, upon a signal from the synchronizing clock 16, the modulo range counters 68 simultaneously access the addresses representing the range units in their respective PRF data blocks to provide an output to the summing network 70. Summing network 70 adds the outputs provided by the random access memory 66 for each range unit and provides a signal representing their summation to the subtractor 72. When subtractor 72 determines that the signal provided by the summing network 70 exceeds a predetermined value which would indicate correlation among all the PRF range signals in a particular range unit, subtractor 72 determines that there is correlation between concurrently accessed addresses representing range units in each of the PRF data blocks and provides a correlation signal to the comparator 30.

The second correlator 28 is comprised of a random access memory 74, a summing network 76 and a subtractor 78. The target returns of each PRF range signal, as provided by STC threshold comparator 64, are stored in the random access memory 74, which, for each PRF range signal, is provided with an address for each range unit in the predetermined range over which the STC threshold level extends. The addresses for each PRF range signal corresponding to a particular range unit in the STC threshold range are concurrently accessed by the synchronizing clock 16 to cause the target returns detected by the STC threshold comparator 64 to be provided to the summing network 76. In a manner similar to that of summing network 70, summing network 76 provides an output signal whose amplitude is representative of the sum of the amplitudes of the PRF range signals for each address of the random access memory 74 which represents a range unit. When the subtractor 78 determines that the output of the summing network 76 exceeds a predetermined level which represents correlation among all the PRF range signals in a particular range unit, subtractor 78 determines that there exists a target return for each PRF range signal in a particular STC range gate and provides a correlation output signal to the comparator 30.

To detect the occurrence of discrete sidelobe clutter returns, comparator 30 determines when a correlation has been detected by the first correlator 26 when there has been no correlation detected by the second correlator 28 to provide a discrete sidelobe clutter signal to the range folder 32. The waveform of FIG. 6 illustrates the output of the comparator 30 for the PRF range signals illustrated in FIG. 5. To perform this logic function, the comparator 30 is comprised of an inverter 80 and an inverting NAND gate 82.

The range folder 32 provides a PRF data block of the discrete sidelobe clutter returns detected by discrete sidelobe detection circuit 22 for each PRF. The PRF discrete data block corresponding to each PRF has the same number of range units as the respective PRF data blocks which were unfolded in range unfolder 20 to provide the unfolded PRF range signal. Waveforms 7-A, 7-B and 7-C of FIG. 7 illustrate the PRF discrete data blocks of the discrete sidelobe clutter returns for the PRF range signals shown in FIG. 5. The range folder 32 includes a random access memory 84 and a modulo range counter for each PRF of the radar, indicated generally by a modulo range counter 86. The random access memory 84 provides a memory address for each range unit of each PRF discrete data block and the addresses associated with each PRF discrete data block are successively accessed by the modulo range counter 86 associated with the corresponding PRF to store the PRF discrete sidelobe data blocks in the random access memory 84.

Under the control of the synchronizing clock 16, the PRF data blocks provided by the normalized threshold circuit 12 and the PRF discrete data blocks of the range folder 32 are simultaneously provided to the data blanker 34, which includes an inverting AND gate 87, to blank the discrete sidelobe clutter returns from the PRF data block of the normalized threshold circuit 12 to provide PRF data blocks containing only target returns for each PRF of the radar set. These PRF target return data blocks are stored in the second buffer 36 and, under the control of the synchronizing clock 16, are unfolded and correlated in the range unfolder-correlator 38. The range unfolder-correlator 38, which includes a random access memory 88, a modulo range counter 90, a summing network 92, and a subtractor 94 simultaneously unfolds and correlates the PRF target data blocks stored in the second buffer 36 over the range of the antenna pattern of the radar to determine the range of the target. The simultaneous unfolding and correlation performed by the unfolder-correlator 38 is illustrated by waveforms 8-A, 8-B and 8-C of FIG. 8 for the PRF target data blocks derived from the PRF data blocks $PRF_5$, $PRF_6$ and $PRF_7$ respectively of FIG. 3. The random access memory 88 includes an address for each range unit of each PRF target data block and provides the unfolded signal as these addresses are successively accessed by the modulo range counter 90. Simultaneously, the unfolded range signals are correlated in the random access memory 88 to determine the range of the target. Although the unfolding function of the range unfolder-correlator 38 is similar to the function of the range unfolder 20, random access memory 88, unlike the random access memory 52, does not have data bits to carry the amplitude of the target signals since this amplitude information was useful only to distinguish the target returns from the discrete sidelobe clutter returns but not useful to determine the range of the target. Similarly to the operation of the summing network 70 and the subtractor 72 in the first correlator 26, summing network 92 provides an output signal whose amplitude is representative of the sum of the PRF target data blocks for each address of the random access memory 88 which represents a range unit in the range of the radar antenna pattern. When the subtractor 94 determines that the output of the summing network 92 exceeds a predetermined level which represents correlation among all the PRF target data blocks in a particular range unit, subtractor 94 determines that there exists a target return for each PRF target data block in a particular STC range gate and provides an output signal which indicates the range gate in which the target is located.

As one example of the operation of the preferred embodiment, FIGS. 3, 4, 5, 6, 7 and 8 illustrate the processing of typical waveforms which could occur. Waveforms 3-A, 3-B and 3-C of FIG. 3 respectively illustrate three PRF data blocks in which the main beam clutter returns have been removed by the doppler filter bank 10, and the area sidelobe clutter returns have been removed by the CFAR threshold circuit 12.

In FIG. 4 waveforms 4-A, 4-B and 4-C represent the $PRF_5$, $PRF_6$ and $PRF_7$ data blocks respectively after they have been unfolded over the STC range by the range unfolder 20. By comparison of FIGS. 3 and 4, it will be seen that the unfolded PRF range signal of range unfolder 20 is a sequential reproduction of the PRF data block of each corresponding PRF.

FIG. 5 represents the comparison made of the unfolded PRF range signals of FIG. 4 with the STC threshold level provided by the STC threshold network 24. Waveforms 5-A, 5-B and 5-C again represent the unfolded PRF data blocks of $PRF_5$, $PRF_6$ and $PRF_7$, respectively. The line 100 represents the STC threshold level being compared to the unfolded STC range signals of the PRF data blocks. Amplitudes in the unfolded STC range signals which exceed the STC threshold level of line 100 are recognized as target returns whereas amplitudes which fall below the line 100 are considered to be discrete sidelobe clutter returns. It is apparent, therefore, that discrete sidelobe clutter returns whose amplitude became large enough with respect to the STC threshold could be recognized as target returns. However, since the STC threshold level indicated by line 100 will track the variations in the level of the area sidelobe clutter returns, high level discrete sidelobe returns will not rise above the STC threshold and be recognized as target returns provided the general phenomenon obtains in which the level of the discrete sidelobe clutter returns follows the level of the area clutter returns.

FIG. 6 shows the output of the discrete sidelobe detection circuit which represents correlations due to the discrete sidelobe clutter returns in the STC range signals of waveforms 5-A, 5-B and 5-C which did not exceed the STC threshold provided by STC threshold network 24. To produce waveform 6-A, the waveforms 4-A, 4-B and 4-C are correlated in the first correlator 26 while the signals of waveforms 5-A, 5-B and 5-C which exceeded the STC threshold level of line 100 are simultaneously correlated in the second correlator 28 and these correlations compared by comparator 30 to detect correlation in the first correlator which are due to the presence of a discrete sidelobe clutter return. The correlations of the first correlator 26 appear in FIG. 4 as the dashed loops 102, 104 and 106. Comparing with FIG. 5, it will be seen that no correlations represented as dashed loops are present because there is no correlation of signals which exceed the STC threshold level in any particular range gate. Therefore, the output of the comparator 30 is as shown in FIG. 6 where the correlations of loops 102, 104 and 106 are present. The loops 102, 104 and 106 are therefore considered to be the correlations of discrete sidelobe clutter returns which are to be blanked from th PRF data blocks provided by the CFAR threshold circuit 12.

The discrete sidelobe clutter signals of each STC range signal are then folded back into PRF discrete data blocks having the original range unit dimensions of the PRF data blocks provided by the CFAR threshold circuit 12 by the folder 32. The folder 32 then provides these PRF discrete data blocks to the data blanker 34 where they are blanked from the PRF data blocks of the CFAR threshold circuit 12 to provide the PRF target data blocks to the unfolder-correlator 38. The unfolder-correlator 38 then simultaneously unfolds and correlates these PRF target data blocks over the range of the radar antenna pattern to produce the unfolded radar range signals shown in waveforms 8-A, 8-B and 8-C of FIG. 8. The correlation of these unfolded radar range signals indicates the range of the target. The correlation of the signals used is indicated by loop 108 showing that a target is present in that range unit.

The present invention utilizes the phenomenon that the level of discrete sidelobe clutter returns generally tracks the level of area sidelobe clutter returns to prevent the discrete sidelobe clutter returns from exceeding the level of the STC threshold whereby they will be recognized as the target returns and correlated to indicate ghost targets. In the preferred embodiment of FIGS. 1 and 2, this is accomplished by causing the STC threshold level of the STC threshold network 24 to track the threshold level of the CFAR threshold circuit 12. FIG. 9 shows an alternative embodiment of the present invention in which the STC threshold level of the STC threshold network 24 does not track the threshold level of the CFAR threshold circuit 12, but in which the level of the discrete sidelobe clutter returns is normalized with respect to the level of the area sidelobe clutter so that the STC threshold level would not be exposed to an increase in the level of the discrete sidelobe clutter returns. Therefore, this alternative emobodiment permits the use of an STC threshold of a constant level.

In the alternative embodiment of FIG. 9, the normalization of the discrete sidelobe clutter returns with respect to the level of the area sidelobe clutter returns is accomplished by a normalizing circuit 110. It can also be seen that the adder 61 and the $\log_2$ converter 62 of FIG. 2 do not appear in FIG. 9 since, due to the normalization operation of the normalizing circuit 110, it is unnecessary to cause the STC threshold level of the STC threshold network 24 to track the threshold level of the CFAR threshold circuit 12. The normalizing circuit 110 is responsive to the output of the doppler filter bank 10 through the AND gate 46, and to the CFAR circuit 38 as scaled by the multiplier 40. The normalizing circuit 110 includes the divider 112 which divides the level of the signals in the PRF data blocks of the doppler filter bank 10 by the level of the area sidelobe clutter returns as determined by the CFAR circuit 38 to normalize the level of the signals of the PRF data blocks with respect to the level of the area sidelobe clutter returns. Since the divider 110 of the normalizing circuit 110 normalizes the amplitude of the signals of the PRF data blocks provided by the doppler filter bank 10, the level of the signals privided by the normalizing circuit will not substantially vary despite radical changes in the actual level of the PRf data block signals, provided the proportionality between the level of the discrete sidelobe clutter returns and the level of the area sidelobe clutter returns, upon which the present invention is premised, obtains.

To explain the operation of the alternative embodiment of FIG. 9 with respect to the waveforms shown in FIGS. 3 through 8, it will be recalled that the waveforms 3A, 3-B and 3-C of FIG. 3 illustrate the signals of the PRF data blocks provided by the doppler filter bank 10. The divider 112 of the normalizing circuit 10 operates to normalize the level of the $D_1$, $D_2$ and T signals by dividing the level of these signals by the level of the area sidelobe clutter as determined by the CFAR circuit 38. Therefore, the relative level of these signals after they have been divided by the normalizing circuit will be substantially the same, despite variations in the level of the signals of the PRF data blocks provided the level of the discrete sidelobe clutter returns is proportional to the level of the area sidelobe clutter returns as has been empirically determined to be the case. Due to this normalization by the divider 112, increases in the level of the $D_1$ and $D_2$ discrete sidelobe clutter signals of the PRF data blocks of the doppler filter bank 10, will not be transferred through the normalizing circuit 110 to the STC range unfolder 20 and the discrete sidelobe detection circuit 22. Therefore, the level of the waveforms of the STC range signals 4-A, 4-B and 4-C of FIG. 4 will not substantially change, and it is sufficient that the STC threshold level of the STC threshold network 24, which is represented as line 100 in waveforms 5-A, 5-B and 5-C of FIG. 5, also remain at a substantially constant level for the discrete sidelobe clutter returns to be distinguished from the true target returns by the discrete sidelobe detection circuit 22. The waveforms shown in FIGS. 6, 7 and 8 would appear substantially the same for the embodiment of FIGS. 1 and 2 or the alternative embodiment of FIG. 9 since only signal presence and not signal level is represented by these waveforms for both embodiments.

From the preceding description and explanation of the disclosed embodiments of the present invention, it will be apparent that the constant false alarm rate circuit 12 and the discrete sidelobe detection circuit 22 of FIGS. 1 and 2 cooperate to provide a means for detecting the occurrence of discrete sidelobe clutter returns in the sensitivity time control range signal of the range unfolder 20 in relation to the adaptive threshold signal of the constant false alarm rate threshold circuit 12. Likewise, the normalizing circuit 110 and the discrete sidelobe detection circuit 22 of FIG. 9 also cooperate to provide a means for detecting the occurrence of discrete sidelobe clutter returns in the sensitivity time control range signal of the range unfolder 20 in relation to the adaptive threshold signal of the constant false alarm rate threshold circuit 12.

Accordingly, in both the preferred embodiment of FIG. 1 and the alternative embodiment of FIG. 9 a method and apparatus has been described which is useful in a radar set for determining the range of a target. The described method and apparatus will compensate for variations in the amplitude of discrete sidelobe clutter returns to reliably eliminate these discrete sidelobe clutter returns from signals received by the radar antenna, despite fluctuations in their amplitude, to provide higher reliability and broader application for radar sets which detect the range of targets.

I claim:

1. A pulse doppler radar receiver for detecting the range of a target from received signals which include target returns, a main beam clutter returns, area sidelobe clutter returns and discrete sidelobe clutter returns, said receiver comprising:

means for filtering the main beam clutter returns from said received signals;

means for providing an adaptive threshold signal which varies in response to the amplitude of the area sidelobe clutter returns, said providing means being responsive to said filtering means to remove said area sidelobe clutter returns from said received signals;

means for unfolding the output of said providing means over a predetermined range, said unfolding means being responsive to the output of said providing means to provide an unambiguous range signal;

means for thresholding the unambiguous range signal in response to both the output of said unfolding means and the adaptive threshold signal of said providing means, the threshold being such that the discrete sidelobe clutter returns are rejected over a selected range of said unambiguous range signal;

means for detecting discrete sidelobe clutter returns in the unambiguous range signal of said unfolding means, said detecting means being responsive to said unfolding means and to said thresholding means to provide a blanking signal;

means for blanking the discrete sidelobe clutter returns detected by said detecting means from the output of said providing means, said blanking means being responsive to said detecting means to provide the target returns of the received signals; and means for determining the range of the target in response to said target returns provided by said blanking means.

2. A pulse doppler radar receiver for detecting the range of a target from received signals which include target returns, main beam clutter returns, area sidelobe clutter returns and discrete sidelobe clutter returns, said receiver comprising:

means for filtering the main beam clutter returns from said received signals;

means for providing an adaptive threshold signal which varies in response to the area sidelobe clutter returns, said providing means being responsive to said filtering means to remove said area sidelobe clutter returns from said received signals;

means for unfolding the output of said providing means over a predetermined range said unfolding means being responsive to the output of said providing means to provide an unambiguous range signal;

first means for comparing the unambiguous range signal of said unfolding means to a sensitivity time control threshold signal which is determined in response to the adaptive threshold signal of said providing means, said comparing means being responsive to the unambiguous range signal and to the sensitivity time control threshold signal to detect target returns in the unambiguous range signal;

first means for correlating the target returns and discrete sidelobe clutter returns of at least two unambiguous range signals in response to the output of said unfolding means;

second means for correlating the target returns detected by said first comparing means in at least two unambiguous range signals in response to the output of said first comparing means;

second means for comparing the correlations of said first and second correlating means, said second correlating means being responsive to the outputs of said first and second correlating means to detect discrete sidelobe clutter returns in the unambiguous range signals of said unfolding means;

means for blanking the discrete sidelobe clutter returns detected by said second comparing means from the output of said providing means, said blanking means being response to said second comparing means and to the output of said providing means to provide the target returns of said received signals; and means for determining the range of the target in response to the target returns provided by said blanking means.

3. The apparatus claimed in claim 2 in which said first comparing means includes:

means for generating a sensitivity time control threshold signal which is a predetermined function of the range of the unambiguous range signal, where said generating means is responsive to the adaptive threshold signal of said providing means so that the amplitude of the sensitivity time control threshold signal is substantially constant with respect to the amplitude of the adaptive threshold signal; and means for comparing the sensitivity time control threshold signal of said generating means with the unambiguous range signal of said unfolding means, said comparing means being responsive to the sensitivity time control threshold signal and the unambiguous range signal to detect the occurrence of target returns in the unambiguous range signal.

4. The apparatus claimed in claim 3 in which said generating means includes:

a first converter for providing the $\log_2$ value of the sensitivity time control threshold signal in response to the range of the unambiguous range signal;

a second converter for providing the $\log_2$ value of said adaptive threshold signal in response to the adaptive threshold signal of said providing means;

an adder responsive to said first and second converters, said adder adding the $\log_2$ outputs of said first and second converters; and a third converter responsive to said adder, said third converter providing the $\log_2^{-1}$ value of the output of said adder to generate a sensitivity time control threshold signal whose amplitude is substantially constant with respect to the amplitude of the adaptive threshold signal.

5. A pulse doppler radar receiver for detecting the range of a target from received signals which include target returns, main beam clutter returns, area sidelobe clutter returns and discrete sidelobe clutter returns, said receiver comprising:

means for filtering the main beam clutter returns from said received signals;

means for providing an adaptive threshold signal which varies in response to the amplitude of the area sidelobe clutter returns, said providing means being responsive to said filtering means to remove said area sidelobe clutter returns from said received signals;

means for normalizing the amplitude of the target returns and the discrete sidelobe clutter returns in response to the adaptive threshold signal of said providing means;

means for unfolding the output of said normalizing means over a predetermined range, said unfolding means being responsive to the output of said normalizing means to provide an unambiguous range signal;

means for thresholding the unambiguous range signal in response to the output of said unfolding means, the thresholding being such that the discrete sidelobe clutter returns are rejected over a selected range of said unambiguous range signal;

means for detecting discrete sidelobe clutter returns in the unambiguous range signal of said unfolding means said detecting means being responsive to said unfolding means and to said thresholding means to provide a blanking signal;

means for blanking the discrete sidelobe clutter returns detected by said detecting means from the normalized output of said normalizing means, said blanking means being responsive to said detecting means to provide the normalized target returns of the received signals; and means for determining the range of the target in response to said normalized target returns provided by said blanking means.

6. The apparatus claimed in claim 5 in which said providing means includes:
  a constant false alarm rate circuit responsive to said filtering means to provide an adaptive threshold signal which varies in response to the area sidelobe clutter; and
  means for detecting, in response to said constant false alarm rate circuit and in response to said filtering means, the target returns and the discrete sidelobe clutter returns having an amplitude greater than the amplitude of the adaptive threshold signal of said constant false alarm rate circuit; and in which said normalizing means normalizes the amplitude of the target returns and the discrete sidelobe clutter returns provided by said comparator with respect to the level of the area sidelobe clutter signals provided by said constant false alarm rate circuit.

7. The apparatus claimed in claim 6 in which said normalizing means is comprised of a divider which is responsive to said comparator and to said constant false alarm rate circuit.

8. A method for detecting the range of a target from signals received by a pulse doppler radar receiver which include target returns, main beam clutter returns, area sidelobe clutter returns and discrete sidelobe clutter returns, said method comprising:
  filtering the main beam clutter returns from said received signals;
  providing an adaptive threshold signal in response to the received signals passed by said filtering step, the adaptive threshold signal varying in response to the area sidelobe clutter returns to remove said area sidelobe clutter returns from said received signals;
  unfolding target returns and discrete sidelobe clutter returns over a predetermined range to provide an unambiguous range signal;
  thresholding the unambiguous range signal against a threshold level established in response to the adaptive threshold signal to pass target signals and to reject discrete sidelobe clutter returns over a selected range of said unambiguous range singal;
  detecting the occurrence of discrete sidelobe clutter returns in the unambiguous range signal in response to the unambiguous range signal of said unfolding step and the targer signals of said thresholding step;
  blanking the discrete sidelobe clutter returns detected in said detecting step from the discrete sidelobe clutter returns of said providing step to provide the target returns of said providing step; and
  determining the range of the target from said target returns provided by said blanking step.

9. A method for detecting the range of a target from signals received by a pulse doppler radar receiver which include target returns, main beam clutter returns, area sidelobe clutter returns and discrete sidelobe clutter returns, said method comprising:
  filtering the main beam clutter returns from said received signals;
  providing an adaptive threshold signal in response to the received signals passed by said filtering step, the adaptive threshold signal varying in response to the area sidelobe clutter returns of the passed signals to remove said sidelobe clutter returns from said received signals;
  unfolding said target returns and discrete sidelobe clutter returns over a predetermined range to provide an unambiguous range signal;
  comparing the unambiguous range signal of said unfolding step to a sensitivity time control threshold signal which is determined in response to the adaptive threshold signal of said providing means, to detect the occurrence of target returns in the unambiguous range signal;
  a first step of correlating the target returns and discrete sidelobe clutter returns of at least two unambiguous range signals of said unfolding step;
  a second step of correlating the target returns detected by said comparing step in at least two unambiguous range signals;
  comparing the correlations of said first and second correlating steps to detect the occurrence of discrete sidelobe clutter returns in the unambiguous range signals of said unfolding step;
  blanking the discrete sidelobe clutter returns detected by said first and second correlating steps from the discrete sidelobe clutter returns of said providing step to provide the target returns of said providing step; and
  determining the range of the target from said target returns provided by said blanking step.

10. A method for detecting the range of a target from signals received by a pulse doppler radar receiver which include target returns, main beam clutter returns, area sidelobe clutter returns and discrete sidelobe clutter returns, said method comprising:
  filtering the main beam clutter returns from said received signals;
  providing an adaptive threshold signal in response to the received signals passed by said filtering step, the adaptive threshold signal varying in response to the area sidelobe clutter returns of the passed signals to remove said area sidelobe clutter signals from said received signals,
  normalizing the amplitude of the target returns and the discrete sidelobe clutter returns with respect to the level of the area sidelobe clutter signals;
  unfolding said normalized target returns and discrete sidelobe clutter returns of said normalizing step over a predetermined range to provide an unambiguous range signal;
  detecting the occurrence of normalized, discrete sidelobe clutter returns in the unambiguous range signal of said unfolding step;
  blanking the discrete sidelobe clutter returns detected insaid detecting step from the normalized discrete sidelobe clutter returns of said normalizing step to provide the normalized target returns of said normalizing step; and
  determining the range of the target from said normalized target returns provided by said normalizing step.

* * * * *